United States Patent [19]

Martins

[11] 4,002,084
[45] Jan. 11, 1977

[54] MOTORCYCLE BRAKING LINKAGE
[75] Inventor: Samuel J. Martins, Reseda, Calif.
[73] Assignee: Airheart Products, Inc., Chatsworth, Calif.
[22] Filed: July 30, 1975
[21] Appl. No.: 600,389
[52] U.S. Cl. .................................. 74/512; 74/516; 188/344
[51] Int. Cl.² ...................... G05G 1/04; G05G 1/14
[58] Field of Search ............ 188/344; 74/516, 512

[56] References Cited
UNITED STATES PATENTS

| | | | |
|---|---|---|---|
| 1,291,664 | 1/1919 | Sehrenk | 74/512 |
| 1,564,261 | 12/1925 | Mathieson et al. | 74/516 |
| 1,890,623 | 12/1932 | Scott | 74/516 |

FOREIGN PATENTS OR APPLICATIONS 1,239,805   7/1971   United Kingdom ............... 188/344

Primary Examiner—Paul E. Maslousky
Attorney, Agent, or Firm—William W. Haefliger

[57] ABSTRACT

A motorcycle brake assembly includes a mount attachable to the motorcycle frame; a braking cylinder on the mount and having a plunger; a plunger actuating lever pivotally supported on the mount; and a crank pivotally supported on the mount and having arms respectively operatively connected with the lever and with a brake pedal in such manner that the mechanical advantage of force transmission is increased as the crank is rotated by the brake pedal.

6 Claims, 5 Drawing Figures

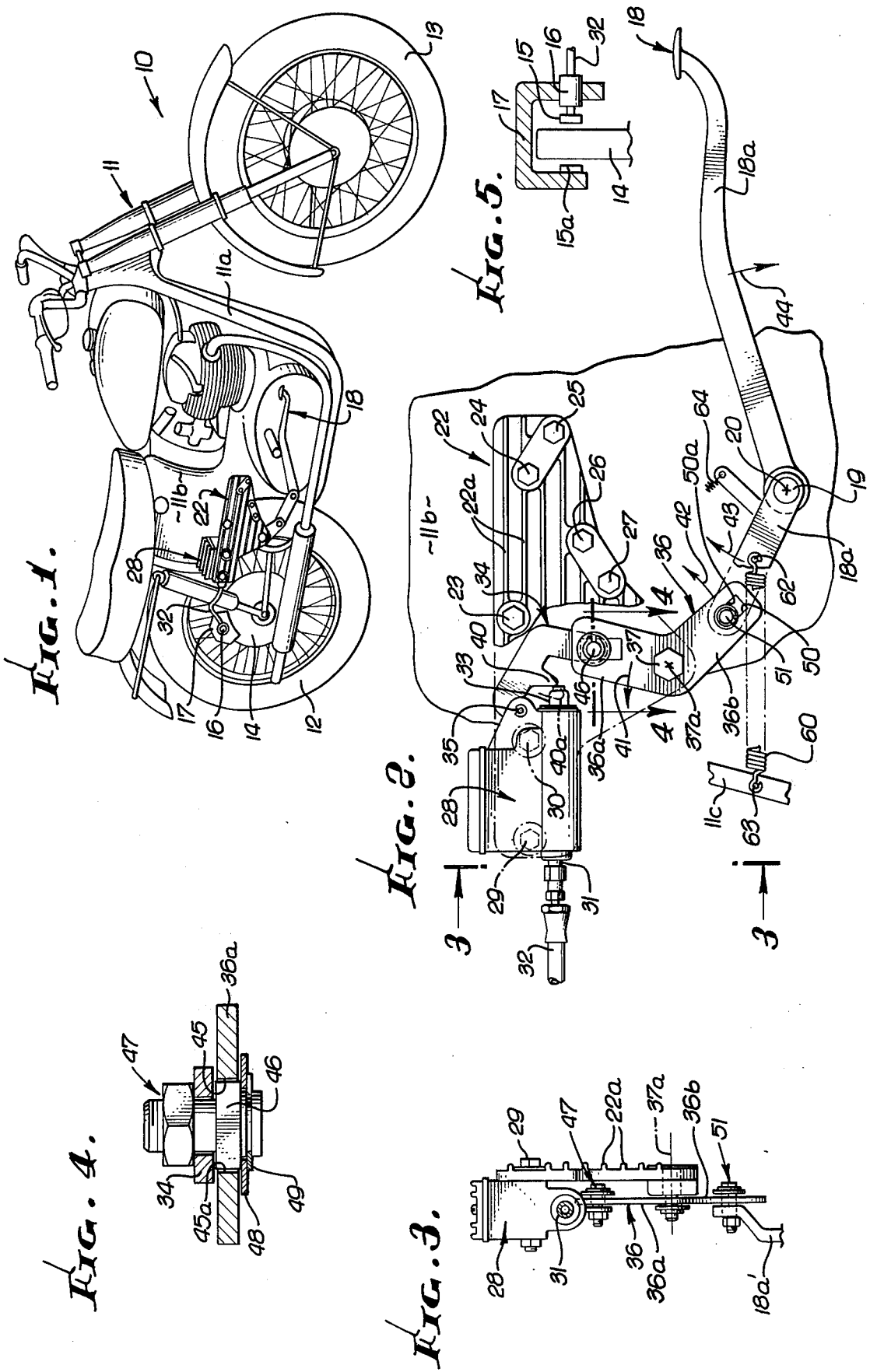

MOTORCYCLE BRAKING LINKAGE

BACKGROUND OF THE INVENTION

This invention relates generally to motorcycle braking, and more particularly concerns a quickly installable hydraulic brake system operatively interconnecting a brake pedal and a brake pad actuator on a motorcycle.

Motorcycles have commonly employed all mechanical linkages between brake pedals and brake pads; however, a need has grown for an hydraulic braking system with its attendant advantages. On the other hand, no way was known, to my knowledge, to provide the unusual advantages in simplicity, ease of installation to a wide range of motorcycle designs, and high efficiency with operatively increasing mechanical advantage as the brake is actuated by the cyclist.

SUMMARY OF THE INVENTION

It is a major object of the invention to provide a braking system embodying the desired features as described above, to overcome problems in prior motorcycle brake installations.

Basically the environment of the invention includes a motorcycle frame, wheel braking surface, braking pad, fluid pressure responsive actuator to urge the pad against that surface, and a pivotally mounted brake pedal. In this environment, the brake assembly of the invention comprises:

a. a mount adapted for attachment to the frame,
b. a braking cylinder on the mount and having a pressurized fluid outlet communicable with said actuator and a plunger movable relative to the cylinder to pressurize fluid therein,
c. a plunger actuating lever pivotally connected to the mount to swing between retracted position relative to the cylinder, and advanced position in which the plunger is moved to pressurize fluid in the cylinder,
d. and a crank pivotally connected to the mount, the crank having a first arm with lost motion pivotal connection to said actuating lever, and a second arm with operative connection to said brake pedal, said lost motion connection increasing the mechanical advantage of force transmission from the crank to the actuating lever as the crank is rotated counterclockwise by the pedal to swing the actuating lever from retracted to advance position.

Further, and as will be seen, the lost motion connection typically may include a guide shoulder and a follower movable therealong and relatively closer to the pivot axis of the crank, as the latter pivots counterclockwise; and the operative connection between the crank second arm and pedal is advantageously defined by a second lost motion connection typically including a second guide shoulder and second follower movable therealong and relatively away from the pivot axis of the crank. These motions combine to produce a multiplicative and increasing mechanical advantage as the brank pedal is displaced to ensure positive and sure stopping.

These and other objects and advantages of the invention, as well as the details of an illustrative embodiment, will be more fully understood from the following description and drawings, in which:

DRAWING DESCRIPTION

FIG. 1 is a perspective view of a motorcycle incorporating the invention;
FIG. 2 is an elevation illustrating the braking assembly of the invention;
FIG. 3 is a vertical end elevation on lines 3—3 of FIG. 2;
FIG. 4 is an enlarged section on lines 4—4 of FIG. 2; and
FIG. 5 shows a disc brake unit.

DETAILED DESCRIPTION

In FIGS. 1, 2 and 5, a motorcycle 10 has a frame 11 that includes, for example, members 11a –11c. The motorcycle also includes wheels 12 and 13, and a wheel braking surface as may be defined by disc 14 rotatable with wheel 12; further, the motorcycle includes a braking pad 15, a fluid pressure actuator 16 carried by caliper 17 and operable to urge pad 15 against disc 14 (with reaction pad 15a urged against the opposite side of the disc in the case of a floating caliper), and a brake pedal 18 pivotally mounted at 19 to frame structure 11b. The axis 20 of pivot 19 extends horizontally.

In accordance with the invention, a mount, as may be defined by vertical plate 22, is adapted for attachment to the frame. Such attachment may be effected by one or more bolts 23–27 passing through the plate and connected with the frame member 11b. A braking cylinder 28 is connected to the mount, as by bolts 29 and 30 for example. The cylinder has a pressurized fluid outlet at 31 communicating with the actuator 16 as via flexible fluid line 32. The cylinder includes a plunger protruding forwardly at 33, there being a suitable piston or piston surface associated with the plunger within a chamber in the cylinder 28. Plate 22 may be ribbed as at 22a, internally, to decrease its weight.

A plunger actuating lever, as at 34, is pivotally connected at 35 to the mount plate to swing clockwise between retracted position (as shown) relative to the cylinder, and advanced position in which the plunger is moved to pressurized fluid in the cylinder. In addition, a crank 36 is pivotally connected as at 37 to the mount plate, the crank having a first arm 36a with lost motion pivotal connection to the lever 34, and a second arm 36b with operative connection to the brake pedal lever 18a. It will be seen that the lost motion connection increases the mechanical advantage of force transmission from the crank 36 to the actuating lever 34 as the crank is rotated counterclockwise in response to downward displacement of pedal 18, to swing the lever 34 clockwise and downwardly from retracted to advanced position. The latter is indicated by the broken line position 40a of the plunger pusher 40 which is part of lever 34 and which projects downwardly, as shown. Arrows 41–44 delineate motions of elements during such clockwise rotation of lever 34. The horizontal axis of crank pivoting is shown at 37a.

The lost motion connection between arm 36a and lever 34 is better shown in FIG. 4 to include a guide shoulder or shoulders 45 and 45a (defining a slot) on or in arm 36a, and a follower 46 movable lengthwise along the guide shoulder (as for example in the slot formed between shoulders 45 and 45a) and relatively closer to axis 37a as the crank pivots counterclockwise, thereby increasing the mechanical advantage. Follower 46 may comprise a cam or disc on the lever 34, a suitable fastener 47 and washers 48 and 49 holding it in position.

Washer 48 and arm 34 overlap the slot at opposite sides of the arm 36a.

In addition, the operative connection between arm 36b and the pedal 18 or pedal lever 18a is advantageously defined by a second lost motion connection between the arm 36b and an extension 18a' of the pedal lever 18a. That second lost motion connection may be much like the first shown in FIG. 4, and may include a second guide shoulder or shoulders 50 and 50a defining a slot therebetween, and a second follower (as for example a cam or disc) 51 movable lengthwise along the shoulder or shoulders and relatively away from the axis 37 as the crank is pivoted counterclockwise by the pedal, again increasing the mechanical advantage of braking force transmission from the pedal to the plunger 33. In this regard, the two described mechanical advantages have a multiplying effect.

Finally, a return or tension spring 60 is connected between the extension 18a' and the frame member 11c to urge the extension in a direction tending to return the actuating lever 34 to retracted position, as shown. The spring connections appear at 62 and 63. An additional or booster return spring is shown at 64.

Accordingly, the simple braking assembly may be very quickly attached as a replacement to a motorcycle frame and to the braking pedal, and to an installed pad actuator on a caliper, to provide a high mechanical advantage hydraulic brake system for the motorcycle, that mechanical advantage increasing as the brake is operated to ensure positive braking and stopping for safety purposes.

I claim:

1. For combination with a motorcycle having a frame, a wheel braking surface, a braking pad, a fluid pressure responsive actuator operable to urge the pad against said surface, and a pivotally mounted brake pedal, the combination comprising
   a. a mount adapted for attachment to the frame,
   b. a braking cylinder on the mount and having a pressurized fluid outlet communicable with said actuator and a plunger movable relative to the cylinder to pressurize fluid therein,
   c. a plunger actuating lever pivotally connected to the mount to swing between retracted position relative to the cylinder and advanced position in which the plunger is moved to pressurize fluid in the cylinder,
   d. and a crank pivotally connected to the mount, the crank having a first arm with lost motion pivotal connection to said actuating lever, and a second arm with operative connection to said brake pedal, said lost motion connection increasing the mechanical advantage of force transmission from the crank to the actuating lever as the crank is rotated counterclockwise by the pedal to swing the actuating lever from retracted to advanced position,
   e. said crank defining a pivot axis, said lost motion connection including a guide shoulder and a follower movable lengthwise along said guide shoulder relatively close to said axis as the crank pivots counterclockwise, the guide shoulder and follower respectively located on said crank first arm and on said actuating lever.

2. The combination of claim 1 wherein said operative connection is defined by a second lost motion connection between the crank second arm and an extension of said pedal, said second lost motion connection including a second guide shoulder and a second follower movable lengthwise therealong relatively away from said axis as the crank is pivoted counterclockwise by the pedal, the second guide shoulder located on the crank second arm, and the second follower located on said pedal extension.

3. The combination of claim 2 in which said guide shoulders are defined by cam slots in the crank first and second arms.

4. The combination of claim 2 including said motorcycle having said frame, wheel braking surface, braking pad, actuator and brake pedal as defined in the preamble of claim 1, the mount attached to said frame above the level of an axis about which the brake pedal pivots.

5. The combination of claim 4 wherein said mount is defined by a plate extending in a vertical plane, said axis extending horizontally.

6. The combination of claim 2 including a return spring connected with said extension and urging same in a direction tending to return the actuating lever to retracted position.

* * * * *